M. C. ROSE.
RESILIENT WHEEL.
APPLICATION FILED JULY 19, 1911.

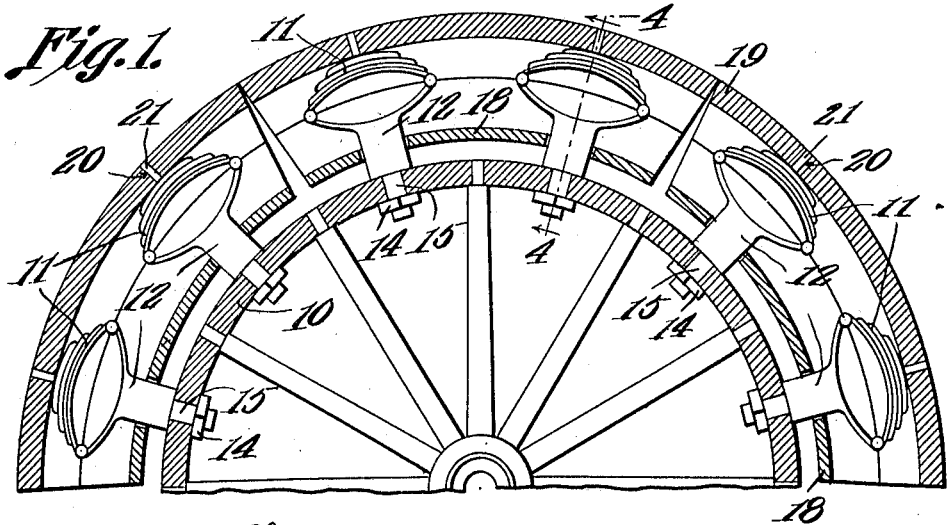
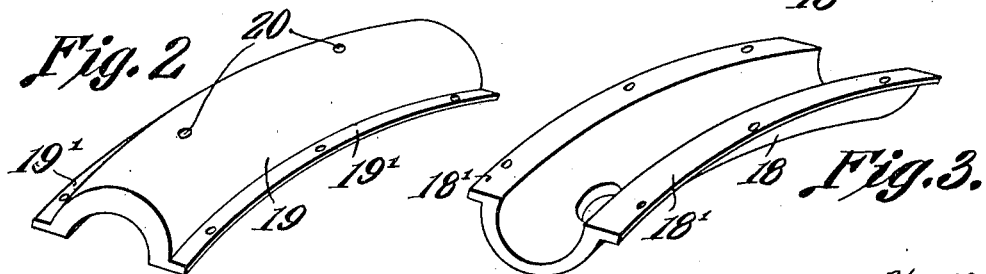
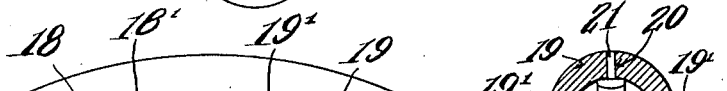
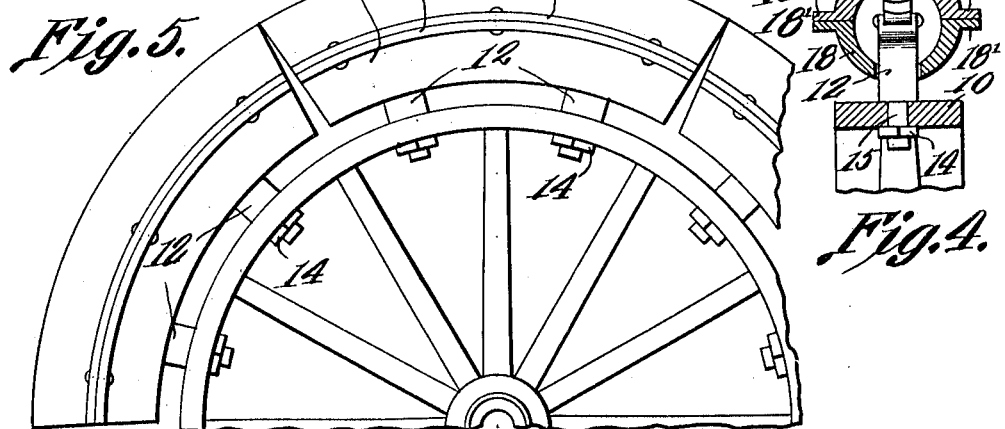

1,035,911.

Patented Aug. 20, 1912.
2 SHEETS—SHEET 2.

Max C. Rose,
Inventor

Witnesses by C. A. Snow & Co.
Attorneys

UNITED STATES PATENT OFFICE.

MAX CHARLES ROSE, OF CLEVELAND, OHIO, ASSIGNOR OF TWELVE AND ONE-FOURTH ONE-HUNDREDTHS TO M. M. KANN AND TWELVE AND ONE-FOURTH ONE-HUNDREDTHS TO SIDNEY HIRSCH, BOTH OF PITTSBURGH, PENNSYLVANIA, SIX AND ONE-EIGHTH ONE-HUNDREDTHS TO GEORGE D. ADAMS, SIX AND ONE-EIGHTH ONE-HUNDREDTHS TO FRANK E. HALL, FOUR AND ONE-TWELFTH ONE-HUNDREDTHS TO EMANUEL S. WEIL, FOUR AND ONE-TWELFTH ONE-HUNDREDTHS TO DAVID ROSENBLUM, AND FOUR AND ONE-TWELFTH ONE-HUNDREDTHS TO EDMUND R. BONDY, ALL OF CLEVELAND, OHIO, AND TWELVE AND ONE-FOURTH ONE-HUNDREDTHS TO GUSTAVE H. KANN AND TWELVE AND ONE-FOURTH ONE-HUNDREDTHS TO FRED J. W. BOWERY, BOTH OF PITTSBURGH, PENNSYLVANIA.

RESILIENT WHEEL.

1,035,911.      Specification of Letters Patent.      Patented Aug. 20, 1912.

Application filed July 19, 1911. Serial No. 639,407.

*To all whom it may concern:*

Be it known that I, MAX C. ROSE, a citizen of the United States, residing at Cleveland, in the county of Cuyahoga and State of Ohio, have invented a new and useful Resilient Wheel, of which the following is a specification.

This invention relates to an improvement in resilient wheels.

The primary object of said invention is to provide a wheel, with a tire formed in section arranged to house resilient means for spacing the same from the wheel rim.

A further object of the invention is to so construct and arrange the springs which space the tire and the rim that the same may be conveniently removed and replaced, and that while in position the tire sections will so house the same that dust and foreign matter will be excluded.

Figure 6:
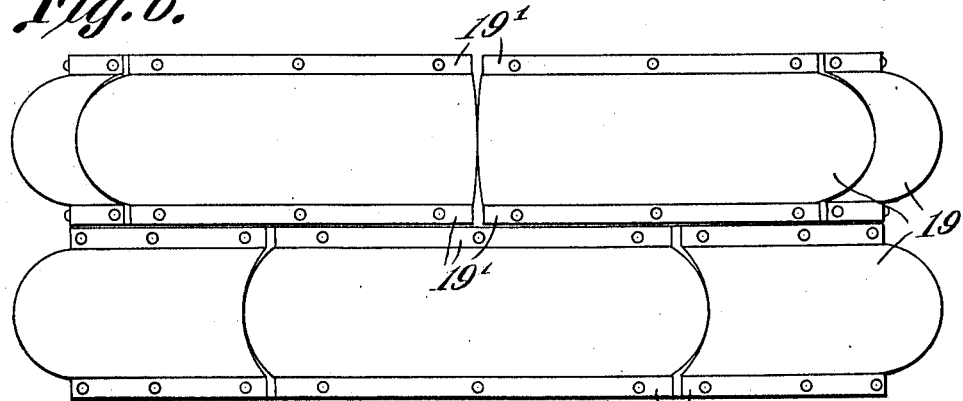
Figure 7:
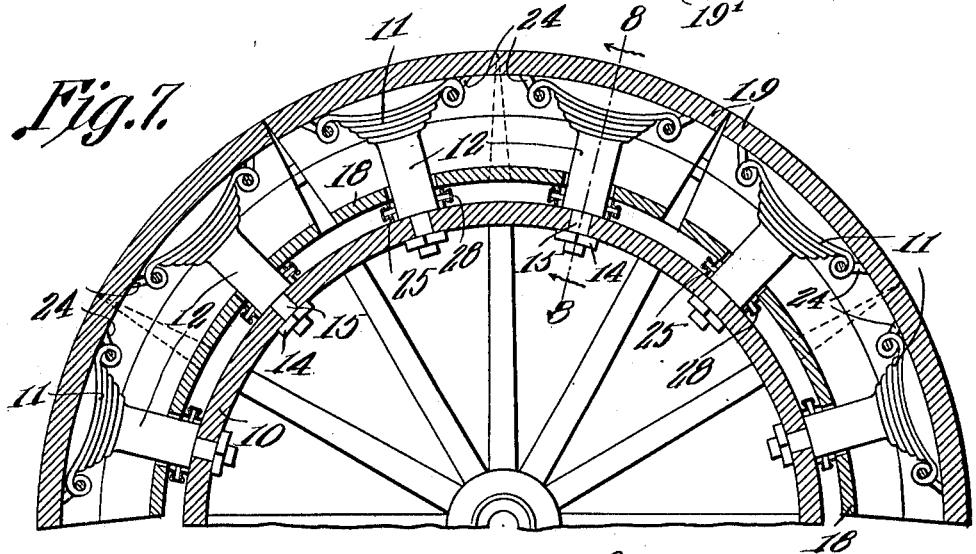
Figures 8, 9:
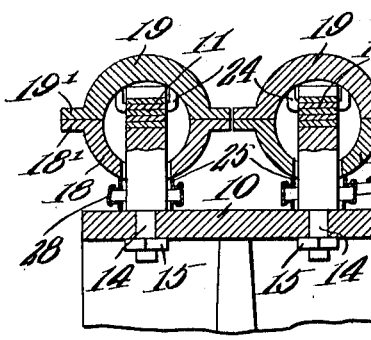

In the drawings:—Figure 1 is a sectional view of a portion of the wheel. Fig. 2 is a perspective view of the outer or tread concaved section. Fig. 3 is a perspective view of the inner concave member. Fig. 4 is a section on the line 4—4 of Fig. 1. Fig. 5 is a side elevation of a portion of the wheel. Fig. 6 is a view showing a slightly modified form of wheel. Fig. 7 is a sectional view showing a slightly modified form. Fig. 8 is a section on the line 8—8 of Fig. 7. Fig. 9 is an enlarged sectional view showing the flexible connection between the rim 10 and the section 18.

In the drawings, 10 designates the wheel rim which supports a plurality of elliptical springs 11. The lower section of these springs are provided with the extensions 12 which extend through apertures in the rim 10 being held against displacement by the nuts 14. The lower sections are also formed with the cylindrical portion 15, the end portion of which coacts with the nut 14 to hold the spring on the rim. The tire is formed of a plurality of inner and outer sections 18 and 19. These sections are concaved and each section is of a length sufficient to house two of the elliptical springs, the lower section 18 being formed with apertures through which the cylindrical portion of the spring extends, this cylindrical portion being of a length sufficient to allow the inner section to be forced inwardly when the load is applied, without contacting with the rim 2. The outer section 19 is provided with apertures 20 which receive the extensions 21 carried by the upper halves of the elliptical springs, the edge portions 18' and 19' of the inner and outer section being flanged, the flanges of the two sections being secured together in order that the sections may move as one member, thus housing the springs to exclude dust and other foreign material.

It will be noted that when the load is applied to the outer or tread section the tire will be forced toward the rim, attention being called to the fact that during this movement the springs which space the tire from said rim are housed, with the exception of the cylindrical enlargement on which the lower sections ride.

The number of sections used in making up the wheel will depend entirely upon the diameter of the wheel desired, and in order to assure a free movement of the resilient supporting tire sections with respect to one another, the end portions of the inner and outer sections are cut diagonally.

It will be noted from the foregoing that a construction of this sort provides a tire which is resiliently spaced from the wheel rim, the resilient means for spacing the tire and rim being housed within the tire.

The many advantages of the peculiar manner of arranging the springs are that the same may be readily removed and replaced and that the entire construction is such as may be easily and economically manufactured.

The form shown in Figs. 6, 7 and 8 is designed for trucks or heavy vehicles and in said form the wheel rim is broadened and on said rim a plurality of resilient tires of substantially the construction shown in Figs. 1 to 5 are secured, said rims being so positioned with relation to each other that the sections are staggered. In order to form a more solid support without decreasing the elasticity of the tire, the spring illustrated in Fig. 7 is employed, said spring being secured to the rim in the same manner as the spring shown in the preferred form, a leaf spring being used in lieu of the elliptical spring shown in the preferred form, the end portions of said spring being secured by means of hangers 24 to the outer sections of the tire.

In order to assist in the exclusion of dirt, the under face of the sections 18 and the rim 10 are provided with the annular members 25 which surround the standards. A sleeve 26 of flexible material has its end portions secured to the offset end 25' of said annular members, said sleeve surrounding the standards 12 and excluding the dust, the sleeves folding as the sections 18 and the wheel are forced together.

The many advantages of a wheel of this character will be clearly apparent as it will be noted that while the same will effectually support a heavy vehicle, the construction is such that proper resiliency of the tires is secured.

It will also be noted that the structure is such as may be easily and economically manufactured.

What is claimed is:—

In a resilient wheel, a rim, a tire formed of a plurality of inner and outer concaved sections, said sections being secured together, the adjacent ends of the sections being cut at an angle to the radius of the wheel, standards supported by the rim, said standards extending through openings formed in the inner concave sections, semi-elliptical springs supported by said standards and link connections between the end portions of said springs and the outer side sections.

In testimony that I claim the foregoing as my own, I have hereto affixed my signature in the presence of two witnesses.

MAX CHARLES ROSE.

Witnesses:
 MITCHELL WEINSTEIN,
 SAMUEL OPPER.

Copies of this patent may be obtained for five cents each, by addressing the "Commissioner of Patents, Washington, D. C."